US006781978B1

(12) United States Patent
Xie et al.

(10) Patent No.: US 6,781,978 B1
(45) Date of Patent: Aug. 24, 2004

(54) METHOD FOR TRANSMITTING COLLISION-FREE MESSAGES IN A COMMUNICATION SYSTEM AND APPARATUS THEREFOR

(75) Inventors: Hai Xie, Fort Worth, TX (US); Thomas Casey Hill, Trophy Club, TX (US); Jheroen Pieter Dorenbosch, Paradise, TX (US)

(73) Assignee: Motorola Inc., Schaumburg, IL (US)

( * ) Notice: Subject to any disclaimer, the term of this patent is extended or adjusted under 35 U.S.C. 154(b) by 0 days.

(21) Appl. No.: 09/285,849

(22) Filed: Apr. 5, 1999

(51) Int. Cl.[7] .............................................. H04Q 7/24
(52) U.S. Cl. ...................... 370/338; 370/345; 370/442; 370/445; 370/458
(58) Field of Search .............................. 370/329, 337, 370/341, 347, 348, 431, 442–466, 468, 276–277, 280, 296, 294, 331–332, 346, 336, 462, 321–322, 345, 338

(56) References Cited

U.S. PATENT DOCUMENTS

| 5,461,627 A | * | 10/1995 | Rypinski ..................... 370/346 |
| 5,706,274 A | * | 1/1998 | Angelico et al. ........... 370/445 |
| 5,721,733 A | * | 2/1998 | Wang et al. ................ 370/332 |
| 5,870,385 A | * | 2/1999 | Ahmadi et al. ............. 370/252 |
| 5,940,771 A | * | 8/1999 | Gollnick et al. ............ 370/311 |
| 6,028,853 A | * | 2/2000 | Haartsen ..................... 370/338 |
| 6,408,009 B1 | * | 6/2002 | Campbell et al. ........... 370/461 |

\* cited by examiner

Primary Examiner—Dang Ton
Assistant Examiner—Inder Palmehra
(74) Attorney, Agent, or Firm—Eduardo Guntin; Charles W. Bethards; Roland K. Bowler II

(57) ABSTRACT

A plurality of wireless transceivers (114) for communicating messages to SCRs (Selective Call Radios) (116) include a radio transceiver (402, 404, 406, 408), and a processing system (412) coupled thereto. A periodic communication cycle (FIG. 9) is divided into a plurality of time slots, each time slot having a duration equal to or greater than the predetermined propagation delay of a signal transmitted between wireless transceivers. Each of the wireless transceivers is assigned to a corresponding one of the time slots. To transmit a message from a selected one of the wireless transceivers to a targeted SCR, the processing system of each of the wireless transceivers is adapted to locate the targeted SCR. Once the targeted SCR is located, the processing system of the wireless transceiver co-located with the targeted SCR is adapted to enable the radio transceiver to monitor transmission energy in the communication medium during a time slot immediately preceding the time slot assigned to said wireless transceiver. If the energy measured is below a predetermined threshold, the processor is adapted to cause the radio transceiver to transmit at least a portion of the message to the targeted transceiver beginning at the time slot assigned to said wireless transceiver.

21 Claims, 7 Drawing Sheets

206

METHOD FOR TRANSMITTING COLLISION-FREE MESSAGES IN A COMMUNICATION SYSTEM AND APPARATUS THEREFOR

FIELD OF THE INVENTION

This invention relates in general to communication systems, and particularly, to a method for transmitting collision-free messages in a communication system and apparatus therefor.

BACKGROUND OF THE INVENTION

Presently, there are many communication medium access protocols in existence for exchanging messages between decentralized communication devices utilizing a common channel. Ethernet is an example of a commonly used communication protocol in decentralized local area networks. Aloha is another.

Ethernet networks employ a channel acquisition technique generally known as CSMA/CD, which stands for Carrier Sense Multiple Access Collision Detection. Essentially, this technique requires a communication device (e.g., a personal computer) to sense a carrier signal of another communication device actively using the communication medium prior to acquiring the channel. If activity is detected, the communication device postpones acquisition of the channel according to a random delay. If no activity is detected, the communication device begins transmitting a message immediately. If upon transmitting the message a collision is detected, the communication device terminates transmission, and postpones acquisition of the channel according to a random delay.

In Aloha networks, on the other hand, a communication device acquires a channel and begins transmission of a message without sensing for other users. A collision is detected upon the communication device failing to receive an acknowledgment signal from the recipient communication device within a specified time. Upon detecting a collision, the communication device postpones reacquisition of the channel according to a random delay. It should be apparent that the potential for collisions in the decentralized communication systems described above makes their use inefficient under high traffic loads. This is especially a problem in systems where a short latency is desirable. Centralized communication systems also may insert unnecessary latency into a lightly loaded system. Accordingly, a method and apparatus is needed for minimizing message collisions without degrading channel utilization efficiency.

DESCRIPTION OF THE PREFERRED EMBODIMENT(S)

Figure 1:
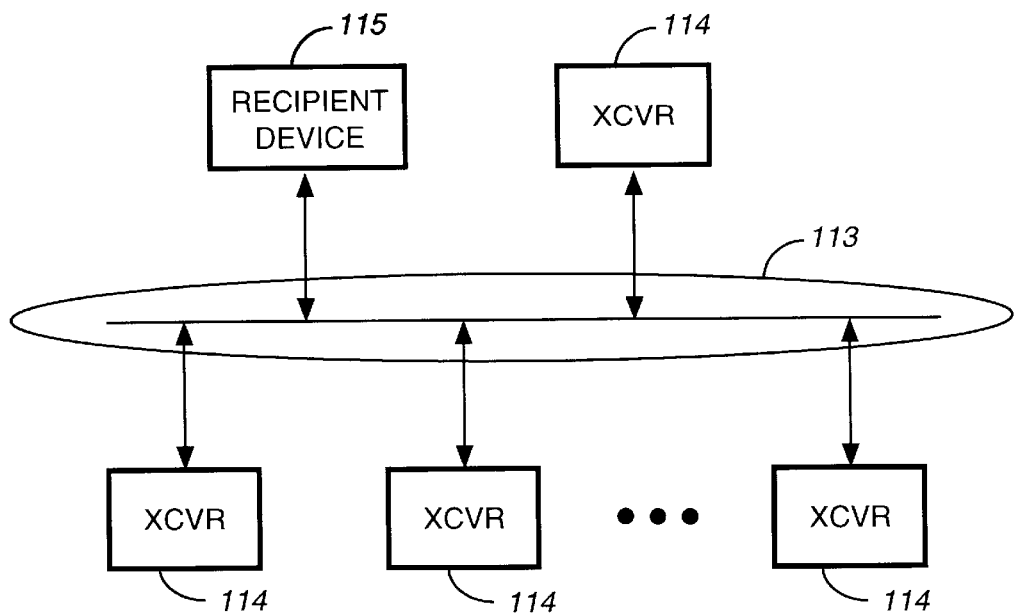
FIGS. 1–2 show alternative embodiments of a communication system, each depicted by an electrical block diagram, according to the present invention.
Figure 2:
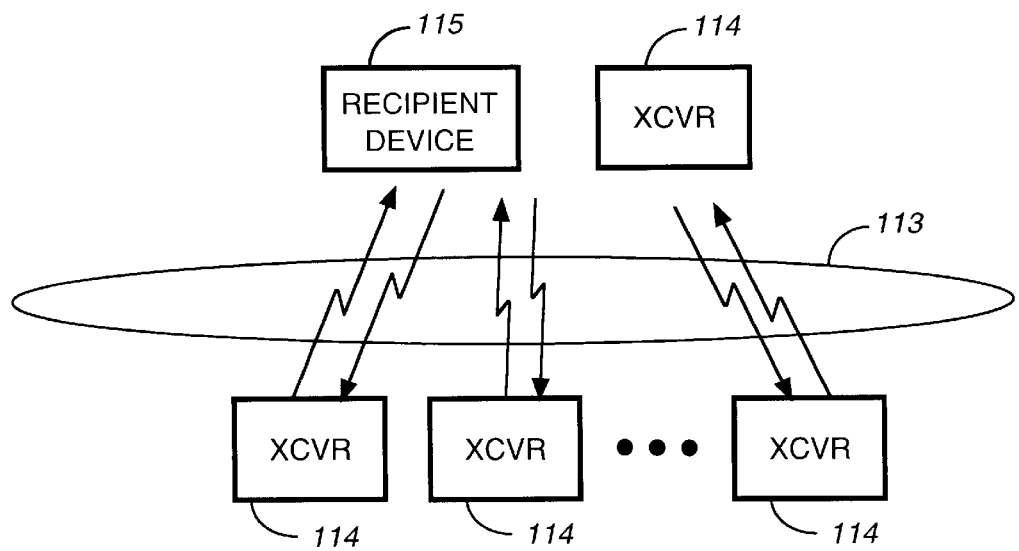

FIGS. 1–2 show alternative embodiments of a communication system, each depicted by an electrical block diagram, according to the present invention. A first embodiment of the communication system shows a plurality of wireline transceivers 114 interconnected by way of a wireline communication medium 113. The second embodiment shown in FIG. 2 is analogous to the system illustrated in FIG. 1 with the exception that the transceivers 114 and the communication medium 113 are wireless. In both of these embodiments, a transceiver 114 is selected for communicating with a recipient communication device 115, which is capable of one-way or two-way communication.

It will be appreciated that the recipient communication device 115 may comprise any one of several embodiments. In one instance, for example, the recipient communication device 115 may comprise a targeted one of the transceivers 114. In another instance, the recipient communication device 115 may comprise a portable or fixed SCR (Selective Call Radio) for wireless applications. Each of these embodiments will be discussed below.

FIGS. 3–8 are flowcharts depicting how each of the embodiments of FIGS. 1–2 operate according to the present invention. The steps shown in the flowcharts of FIGS. 3–6 are preferably programmable instructions followed by each of the transceivers 114. The implementation of the transceiver 114 will be discussed later. As depicted, the flowchart of FIG. 3 begins with step 202. In this step a periodic communication cycle is divided into a plurality of time slots. Each time slot has a duration equal to or greater than the predetermined propagation delay of a signal transmitted between transceivers 114.

Preferably, the predetermined propagation delay is determined from a signal transmitted between a selected two of the transceivers 114 that are farthest apart. The propagation delay may be measured according to the distance between the selected transceivers 114 divided by the speed of light. For example, a signal transmitted between two transceivers 114 separated by a distance of 100 kilometers has a propagation delay of approximately 334 us (microseconds). This absolute time may be adjusted to, for example, 350 us to provide the transceivers 114 additional time for processing signals-this processing step will be discussed shortly.

Figure 9:
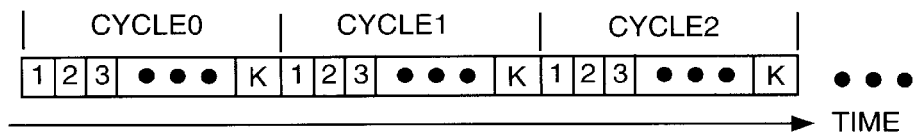
FIGS. 9–10 show timing diagrams illustrating the collision-free communication technique employed by the embodiments of FIGS. 1–2 according to the present invention.
Figure 10:
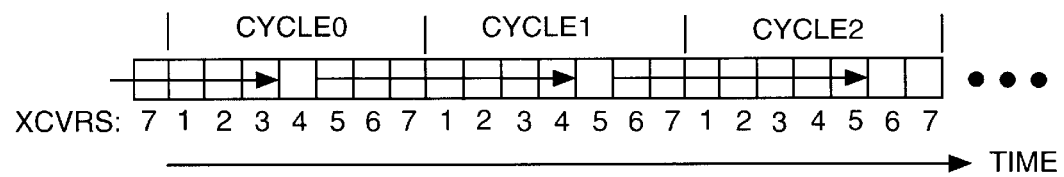

In step 204 each of the transceivers 114 are assigned to a corresponding one of the time slots. FIG. 9 shows by way of example periodic cycles (0–2) divided into K time slots. In the case of seven transceivers 114, for example, a periodic communication cycle is divided into seven time slots. This example is shown in FIG. 10, whereby one of the transceivers 114 is assigned to time slot 1, another transceiver 114 is assigned to time slot 2, and so on. Under this arrangement, a sequence of seven periodic time slots, each time slot having, for example, a duration of 350 us, has a cycle time of 2.450 ms (milliseconds).

Figure 11:
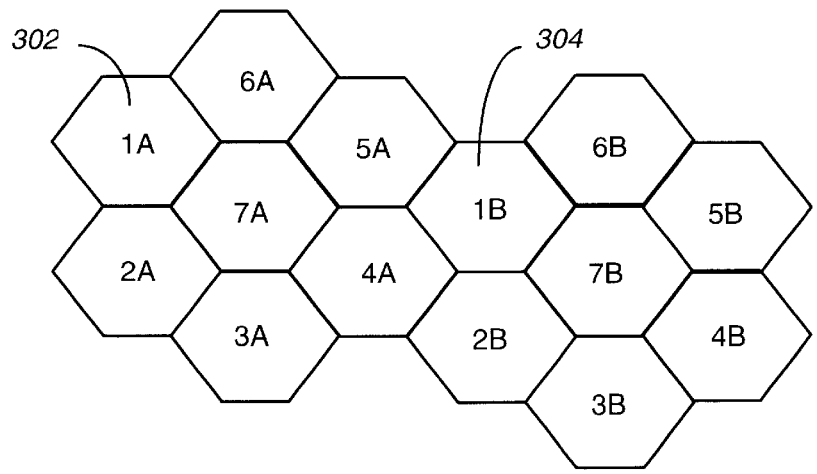
FIG. 11 shows a reuse pattern employed by the alternative embodiments of FIGS. 1–2 according to the present invention.

The cell clusters of FIG. 11 also help to illustrate steps 202 and 204 in a wireless application for geographically fixed transceivers 114 according to the present invention. FIG. 11 shows two clusters of seven transceiver 114 communication zones (hereinafter referred to as cells). A first cluster 302 comprises seven transceiver 114 cells 1A–7A, and a second cluster 304 comprises seven transceiver 114 cells 1B–7B. According to the organization of transceivers 114 within these clusters, step 204 may be implemented by assigning each cluster to the same time slot arrangement. For example, transceiver 114 of cell 1A may be assigned to time slot 1, transceiver 114 of cell 1B may be assigned to time slot 1, transceiver 114 of cell 2A may be assigned to time slot 2, transceiver 114 of cell 2B may be assigned to time slot 2, and so on. Since cells 1A and 1B are geographically far apart, simultaneous transmission from the transceivers 114 of these zones during the same time slot will not cause significant interference while utilizing the same channel. Thus, based on the arrangement of FIG. 11, time slot reuse (at a single transmission frequency) may be used to substantially expand the channel capacity of a communication system.

Step 202 discussed above may be implemented by, for example, selecting the transceivers 114 of zones 1A and 4A to pre-select a time slot duration. To avoid having varying time slot durations per cluster, the cluster having the farthest two transceivers 114 is preferably used for defining the duration of time slots for all clusters. In this manner, all transceivers 114 are guaranteed to have sufficient time to monitor traffic activities in the communication medium 113. This preference is especially important for mobile recipient communication devices 115 such as, for example, a portable SCR.

Turning now to step 206, a message is transmitted from a selected one of the transceivers 114 to the recipient communication device 115. This step may be accomplished in any one of several embodiments. In a first embodiment, this step comprises the steps shown in the flowchart of FIG. 4. This flowchart begins with step 208 where the selected transceiver 114 monitors transmission energy in the communication medium 113 at a time slot immediately preceding the time slot it was assigned. If at step 210 the energy measured is above a predetermined threshold (indicating traffic activity), the transceiver 114 selected proceeds to step 212 where it waits for the next communication cycle, and proceeds to step 208 where it repeats the monitoring process. If, on the other hand, the energy measured in step 210 is below the predetermined threshold (indicating an available communication medium 113), the transceiver 114 selected proceeds to step 214 where it transmits at least a portion of the message to the recipient communication device 115 beginning at the time slot it was assigned.

As just noted, the predetermined threshold identifies when the communication medium 113 is inactive. This threshold may be determined conventionally by experimentation or by measurements taken of the RF (Radio Frequency) characteristics (e.g., Receive Signal Strength Indication—RSSI level) of the communication medium 113. The threshold selected must be such that each transceiver 114 can reasonably predict within its own cluster whether there is activity in the communication medium 113 during the time slot being monitored.

At step 215, the transceiver 114 determines whether the length of the message to be transmitted exceeds a predetermined maximum message length. The predetermined maximum message length may be selected uniquely for each transceiver 114 or universally as one predetermined maximum message length for all transceivers 114. As an example, the predetermined maximum message length may be selected so that transmission terminates when the transceiver 114 selected more than five hundred packets of message data.

Thus, at step 215, the transceiver 114 transmits less than the whole message when the length of the message exceeds the predetermined maximum message length. When this happens, the transceiver 114 proceeds to step 212 and wait for the next communication cycle to reacquire the communication medium 113. If, on the other hand, the predetermined maximum message length has not been exceeded, the transceiver 114 proceeds to step 218 where it checks whether transmission of the message has been completed. If it has not, then the transceiver 114 proceeds to step 214 where it continues to transmit the message. If the transmission of the message has been completed, then the transceiver 114 proceeds to step 208, where it proceeds as mentioned above.

Figure 4:
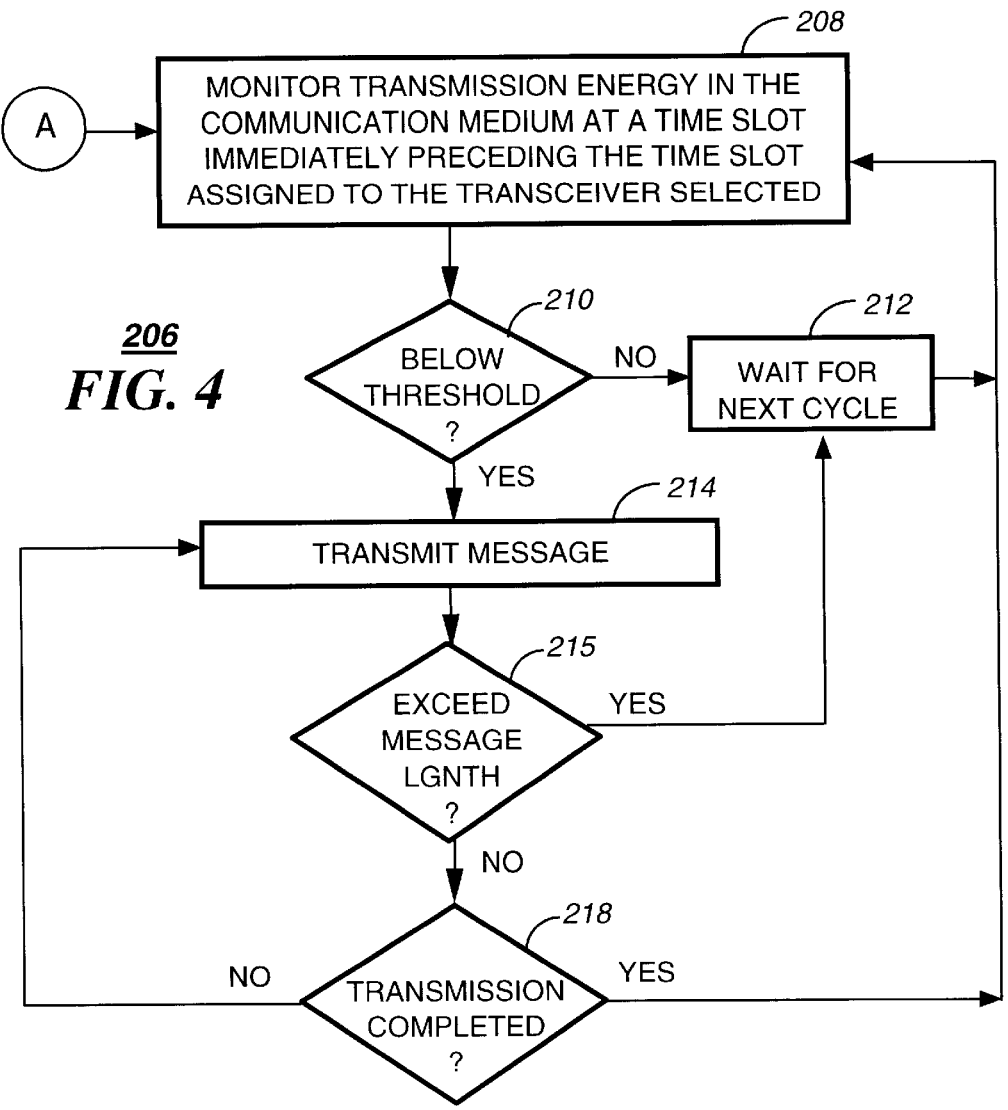

Because of the random nature of message lengths, the embodiment of FIG. 4 provides equitable priority in the acquisition of the communication medium 113 amongst the transceivers 114. This is because the point where transmission terminates in most instances is random, thereby resulting in a random distribution of blocking and unblocking of transceivers 114 within a cluster.

Figure 5:
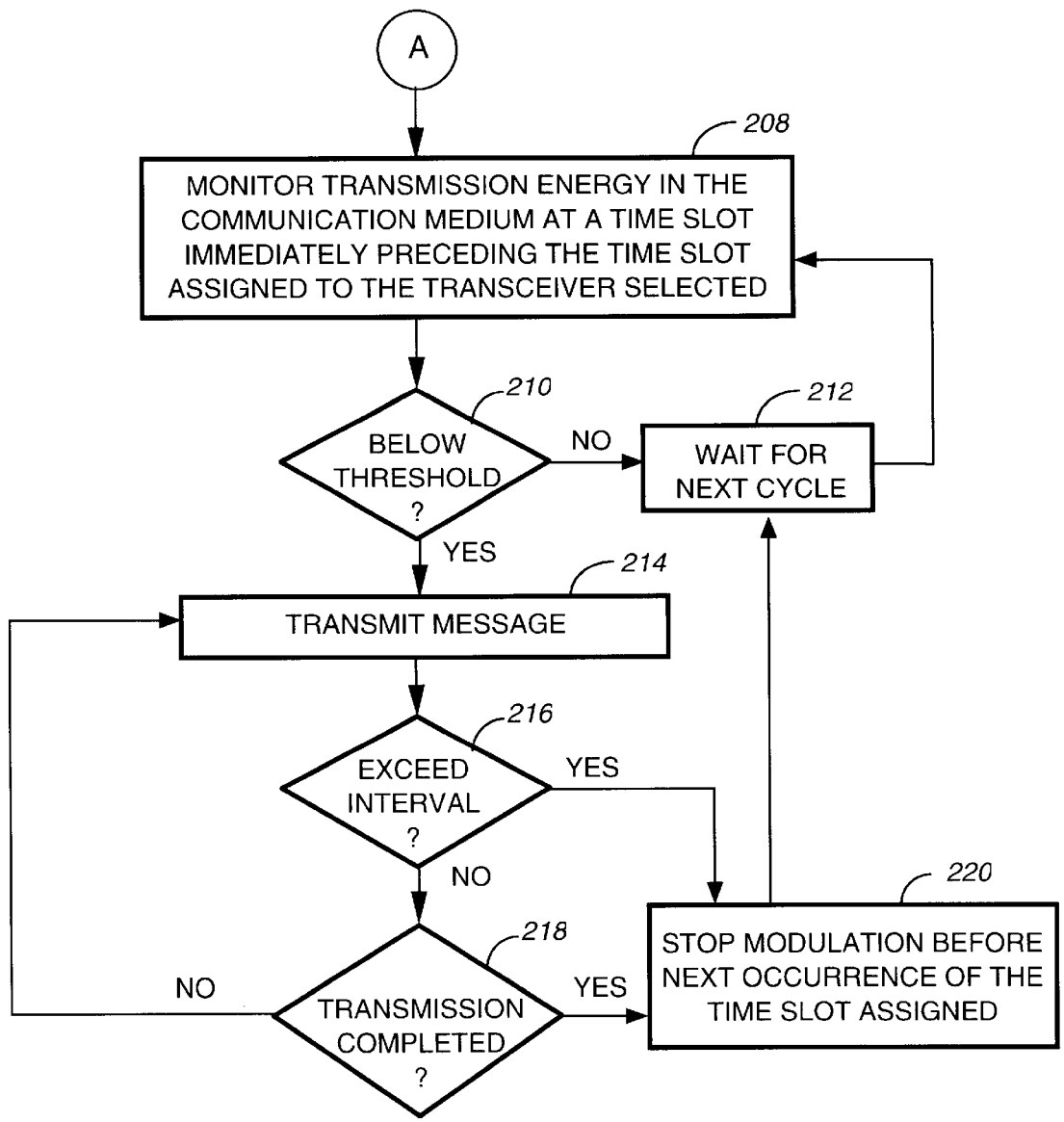

Alternatively, the embodiment shown in FIG. 4 may be implemented according to the embodiment of FIG. 5. Under the embodiment of FIG. 5, steps 208, 210, 212, and 214 operate as described for FIG. 4. Step 215, however, is replaced with step 216, and the flow of step 218 differs from that of FIG. 4. Principally, at step 216, the transceiver 114 determines whether the time taken to transmit the message exceeds a predetermined interval. The predetermined interval may be selected uniquely for each transceiver 114 or universally as one predetermined interval for all transceivers 114. As an example, the predetermined interval may be selected so that transmission terminates when the transceiver 114 selected has been transmitting for more than two contiguous communication cycles.

Therefore, at step 216, the transceiver 114 transmits less than the whole message when the time necessary for transmitting the message exceeds the predetermined interval. When this happens, the transceiver 114 proceeds to step 220. At step 220, the transceiver 114 continues to transmit a modulated signal, comprising in part a portion of the message, and terminates said modulation before the next occurrence of the time slot assigned to the transceiver 114 selected. The transceiver 114 then proceeds to step 212 where it awaits to transmit the remainder of the message at the next available opportunity, which may be, for example, the next communication cycle.

If, on the other hand, the predetermined interval has not been exceeded, the transceiver 114 proceeds to step 218 where it checks whether transmission of the message has been completed. If it has not, then the transceiver 114 proceeds to step 214 where it continues to transmit the message. If the transmission of the message has been completed before the end of the predetermined interval, then the transceiver 114 proceeds to step 220, where it proceeds as mentioned above and waits for the next message.

Steps 208–220 of FIG. 5 may be described by way of the illustration provided in FIG. 10. This example shows three communication cycles (0–2), each cycle with seven time slots, and each time slot assigned to one of seven transceivers 114.

The arrows shown represent the modulation of signal which in part may carry a portion of the message followed by a modulated signal that does not include message (e.g., a pilot signal). To properly begin discussion of the illustration of FIG. 10, assume that the first arrow is representative of a transceiver 114 that has terminated transmission of a modulated signal at the end of the time slot 3.

Under this scenario, the transceivers 114 assigned to time slots 1–4, respectively, are blocked from acquiring the communication medium 113 during cycle 0. This is because when the transceiver 114 assigned to time slot 1 monitors time slot 7, it will measure transmission energy and therefore wait until the next communication cycle (i.e., cycle 1) to try again. The same happens to the transceivers 114 assigned to time slots 2, 3 and 4, respectively. This is because the time slot preceding the time slot assignment to each transceiver 114 also has transmission energy, thereby precluding each transceiver 114 from acquiring the communication medium 113.

The transceivers 114 assigned to time slots 5–7, however, are not blocked, and therefore have an opportunity to acquire the communication medium 113. In this example, the transceiver 114 assigned to time slot 5 has acquired the communication medium 113. This is a valid acquisition because time slot 4, which immediately precedes time slot 5 assigned to the transceiver 114 has no transmission energy, indicating that the communication medium 113 is available for transmission. It should be obvious from this example that the transceivers 114 assigned to earlier time slots have an advantage over transceivers 114 assigned to downstream time slots.

An additional method for avoiding a biased priority of time slot assignments amongst the transceivers 114 is for each transceiver 114 to be programmed to follow two rules. A first rule requires that no transceiver 114 may transmit messages for an indefinite amount of time. All transceivers 114 are preferably programmed to transmit messages for no more than a predetermined time (e.g., one cycle at a time). Alternatively, each of the transceivers 114 may be programmed with differing time limits, which in itself may be viewed as a means of assigning differing degrees of priority to each transceiver 114. This first rule is represented by step 216 of FIG. 5.

A second rule for providing equity amongst the transceivers 114 is to force the transceiver 114 that has acquired the communication medium 113 to terminate transmission at the time slot immediately preceding its own. This is shown in FIG. 10, where the transceiver 114 assigned to time slot 5 terminates transmission at time slot 4, which immediately precedes its own time slot. Terminating at time slot 4 blocks the transceiver 114 from reacquiring the communication medium 113, and additionally blocks the transceivers 114 assigned to time slots 1–3. This method gives the transceiver 114 assigned to time slot 6 an opportunity to acquire the communication medium 113. By applying the second rule to all transmissions, each of the downstream transceivers 114 is given an equal chance to acquire the communication medium 113.

There may be instances under the second rule where the fairness algorithm just described will result in no transceivers 114 acquiring the communication medium 113 during a particular cycle. For example, in the case where the transceiver 114 terminates at time slot 5, it may be that the transceivers 114 assigned to time slots 6 and 7 do not have messages to transmit, and therefore do not acquire the communication medium 113. It is also possible that one of the other upstream transceivers 114 assigned to time slots 1–4 may have wanted to acquire the communication medium 113, but, as mentioned above, was blocked off to give access to the downstream transceivers 114. Under this scenario, a block of airtime within the communication cycle will be unutilized.

Although this results in some degree of inefficiency in channel utilization. The effect is negligible when considering the amount of dead-airtime. A substantial benefit of the present invention is that the duration of time slots is extremely small when compared to the duration of message transmission. As mentioned above by way of example, a time slot may have a duration of 350 us. Hence, in all cases there will be less than 2.45 ms of latency for reacquisition of the communication medium 113 by a transceiver 113 that was blocked from transmitting in accordance with the aforementioned fairness algorithm.

It should be noted also that the predetermined time interval for transmitting a message may expire before the transceiver 114 that acquired the communication medium 113 has reached the time slot immediately preceding its own. In this instance, message transmission may be continued until the transceiver 114 reaches the time slot immediately preceding its own or, alternatively, the transceiver 114 may transmit a modulated signal (e.g., a pilot signal) without message information. Preferably, termination of transmission of the message occurs at a distinct message boundary, e.g., at a packet boundary. If terminating at a time slot boundary would result in a fragmented packet, then message transmission is terminated at an earlier packet followed by a modulated signal without message information terminating at the immediately preceding time slot of the transceiver 114.

The foregoing principles stated for the second rule are represented by step 220 of FIG. 5.

Figure 3:
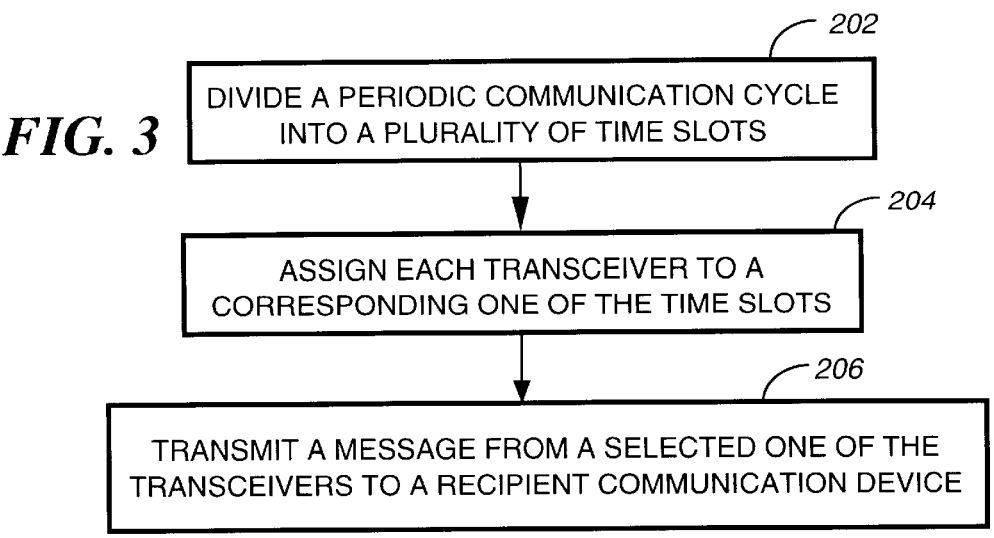
FIGS. 3–8 are flowcharts depicting how each of the embodiments of FIGS. 1–2 operate according to the present invention.

The combination of the flowcharts of FIGS. 3 and 4, or 3 and 5) just described are pertinent to embodiments for wireline and wireless communications between geographically fixed transceivers 114 and a geographically fixed recipient communication device 115 such as, for example, a targeted one of the transceivers 114, or a one-way communication device. The combination of the flowcharts of FIGS. 3,4 (or 5) and 6 are representative of an alternative embodiment for wireless communications between geographically fixed transceivers 114 and a mobile recipient communication device 115 represented by a portable SCR (Selective Call Radio). The hardware of the SCR will be discussed later.

Under this embodiment, the description of steps 202 and 204 of FIG. 3 remain unchanged. Step 206, however, is represented by the combined steps shown in FIG. 6 followed by the steps shown in FIG. 4 (or, alternatively, FIG. 5). Hence, to transmit a message from a selected one of the transceivers 114 to a targeted SCR, all of the transceivers 114 proceed to step 221 to determine which of the wireless transceivers 114 is co-located with the targeted SCR. This step is implemented in three sub-steps. To locate the SCR, each of the transceivers 114 proceed to step 222.

In this step the transceivers 114 transmit a corresponding wireless transceiver identification number unique to each transceiver 114. In step 224, the transceivers 114 transmit in simulcast (i.e., simultaneous transmission) an inquiry message to the targeted SCR. In step 226, the transceivers 114 monitor for a transmission from the SCR. From this monitoring step, it is expected that one or more transceivers 114 will receive a message from the targeted SCR, the message including a selected one of the identification numbers transmitted by the plurality of wireless transceivers 114. The transceiver 114 having an ID that matches the number received from the SCR, is identified as the transceiver 114 co-located with the targeted SCR. Once the SCR has been located, the transceiver 114 co-located with the SCR proceeds to the flowchart of FIG. 4 (or, alternatively, FIG. 5). The description given above for the steps of FIG. 4 (or FIG. 5) remain unchanged with the exception that the message being transmitted is to a portable SCR.

It will be appreciated that additional information on a method for locating SCRs in a radio communication system may be found in U.S. Pat. No. 5,423,063 entitled, "Method and Apparatus for Identifying a Transmitter in a Simulcast Radio Communication System", assigned to the assignee of the present invention, and which is incorporated by reference herein.

Figure 6:
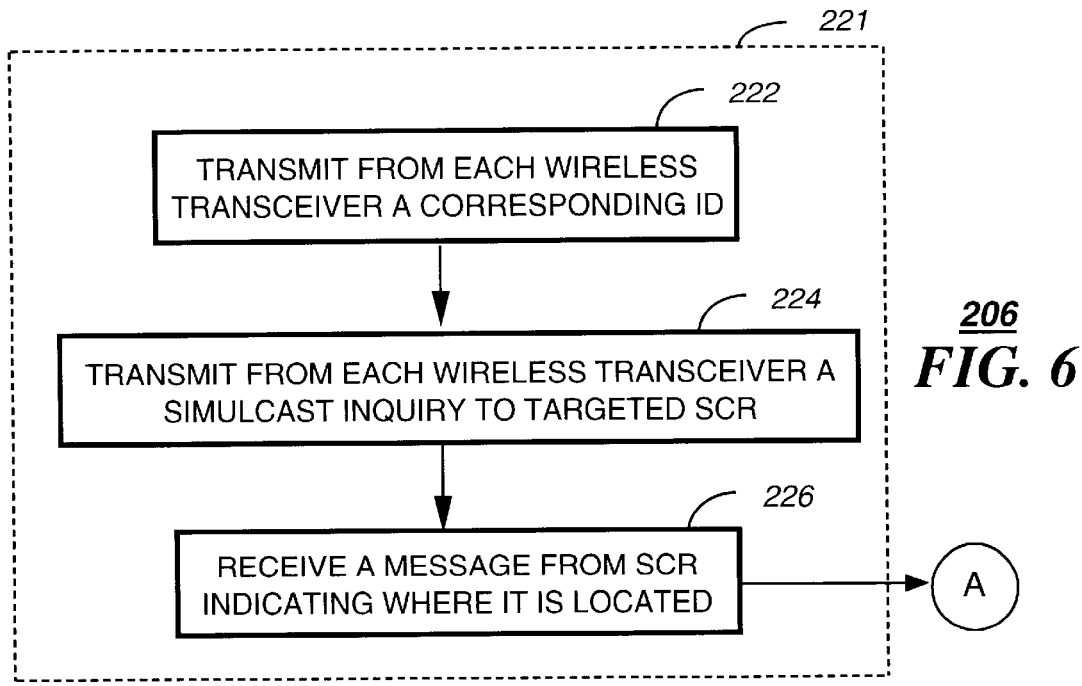

Note, if the targeted SCR moves out of the communication zone of the transceiver 114, this event will be recognized by the failure of the transceiver 114 to receive and acknowledgment signal from the SCR. In this instance, the steps described in FIG. 6 are repeated to re-locate the SCR. Once the SCR has been located again, the portion of the message remaining is transmitted from the previous transceiver 114 to the new transceiver 114 co-located with the SCR. The new transceiver 114 then transmits the remaining portion of the message to the SCR according to the steps of FIG. 4 (or FIG. 5).

The invention just described for communicating messages from a wireless transceiver 114 to a SCR, may also be used for communicating messages from a SCR to a co-located wireless transceiver 114. This embodiment is illustrated by the combined steps of FIG. 6 and FIG. 4 (or, alternatively, FIG. 5). The flowchart of FIG. 7 begins with step 228. In this step, at the co-located transceiver 114, a periodic communication cycle is divided into a plurality of time slots (similar to what is shown in FIG. 9). The duration of a time slot in this instance is preferably measured according to the delay of a signal transmitted between two SCRs that are farthest apart. Preferably, the distance selected is between two SCRs at the fringes of the communication zone of the transceiver 114.

Figure 7:
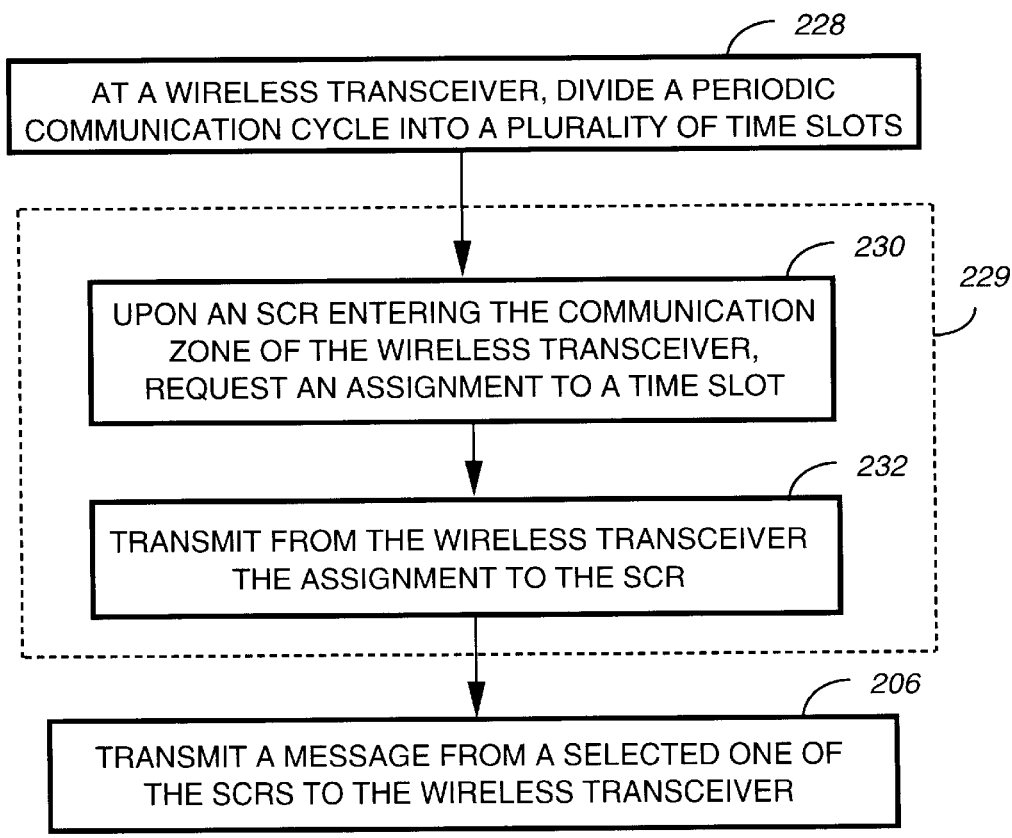

In step 229, each of the SCRs co-located with the transceiver 114 are assigned by the transceiver 114 to one of the time slots. As FIG. 7 shows, the assignment step is divided into two sub-steps. In step 230, an SCR entering the communication zone of the transceiver 114, requests from the transceiver 114 an assignment to a corresponding one of the time slots. Once this request has been received, the transceiver 114 transmits an assigned slot to the SCR. Once the SCR has been assigned a time slot, it can actively monitor the communication medium 113 at step 206 to transmit a message to the co-located transceiver 114. The implementation of step 206 is again shown in FIG. 4 (or, alternatively, FIG. 5). The discussions of the flowchart of FIG. 4 (or FIG. 5) remain applicable to this embodiment.

It is well-known to those of ordinary skill in the art that portable SCRs generally do not have the transmission power of geographically fixed transceivers 114 such as those shown in FIG. 11. Additionally, it is well-known that because portable SCRs are normally handheld units, the receiver antenna will be no more than a meter above ground level, thereby limiting its range for receiving weak signals. It is therefore possible that SCRs located opposite to each other at the fringes of the communication zone of a transceiver 114 may not be able to monitor each other's transmissions. When both of these SCRs have messages to transmit to the co-located transceiver 114 it is possible that both SCRs will acquire the communication medium 113 even though one of them had acquired the communication medium 113 first. As SCR transmitting and receiving capabilities improve, the foregoing collision is unlikely to occur.

Figure 8:
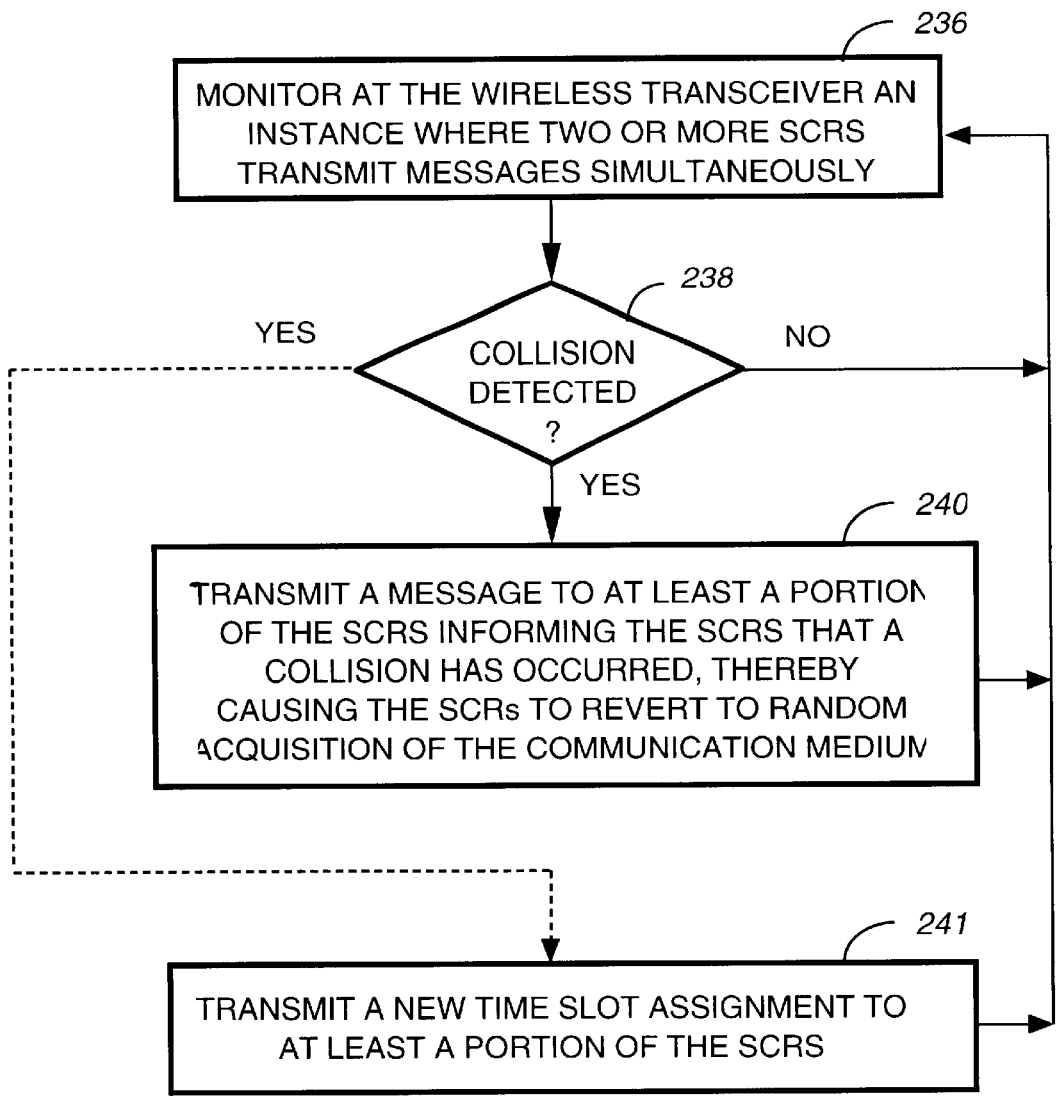

However, to resolve this problem, the co-located transceiver 114 and SCRs are programmed to operate as shown in FIG. 8. The flowchart begins with step 236, where the wireless transceiver 114 co-located with the SCRs monitors an instance where two or more SCRs transmit messages simultaneously, representative of a collision event. At step 238, if no collision is detected, the wireless transceiver 114 continues to monitor for collisions. If, on the other hand, a collision is detected, the wireless transceiver 114 proceeds to step 240 where it transmits to at least a portion of the SCRs informing said SCRs that a transmission collision has occurred. This in turn causes the SCRs to revert to random acquisition of the communication medium. Alternatively, the wireless transceiver 114 proceeds to step 241 where it transmits a new time slot assignment to at least a portion of the SCRs.

Collisions are detected by the wireless transceiver 114 as a result of receiving an undecodable message over an extended period of time. Any number of embodiments may be used by the SCRs for randomly acquiring the communication medium. For example, the SCRs may be programmed to transmit a message to the wireless transceiver 114 at their correspondingly assigned time slot at random times. The random times may be selected uniquely by using, for example, a random time generator at each SCR, whereby each SCR uses as a generator seed its assigned time slot number.

Figure 12:
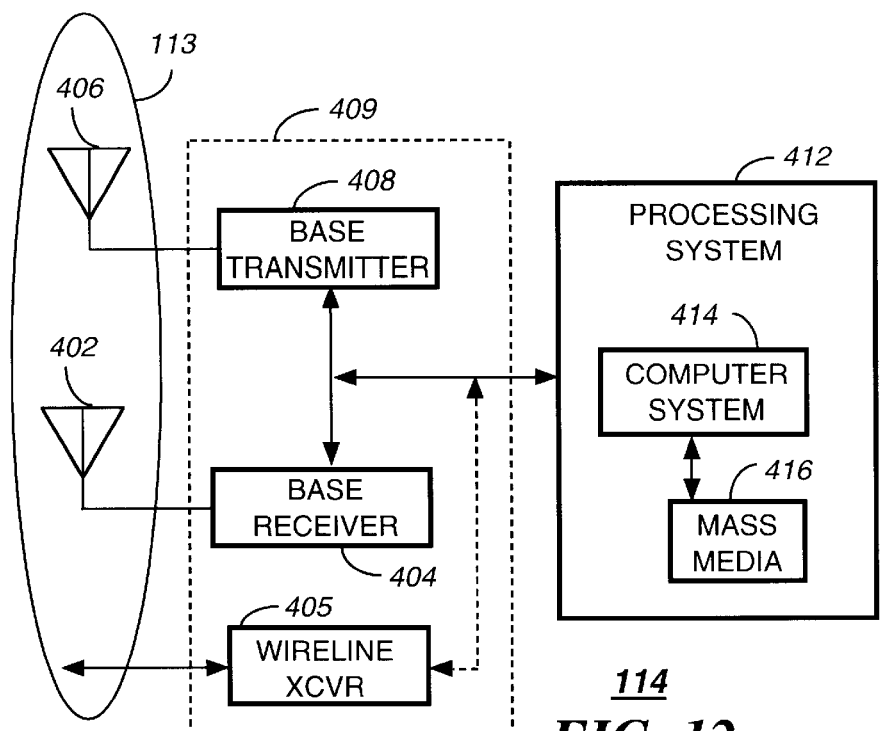
FIGS. 12–13 show electrical block diagrams of wireline and wireless transceivers and SCRs (Selective Call Radios), respectively according to the present invention.

According to the present invention, the operational embodiments described above for the wireless transceiver 114 and the SCR are implemented as shown in the electrical block diagrams of FIGS. 11–12, respectively. FIG. 12 is an electrical block diagram of the wireless transceiver 114. As shown, the wireless transceiver 114 comprises a processing system 412, and a transceiver 409. The processing system 412 is used for directing operation of the transceiver 409. To accomplish this task, the processing system 412 includes a conventional computer system 414 and a conventional mass storage media 416. The computer system 414 is programmed by software stored in the mass storage media 416. The software operates as depicted in the flowcharts discussed above.

The transceiver 409 is coupled to the processing system 412 for transmitting messages to the recipient communication device 115, which as described above may take the form of a SCR, or a one-way or two-way transceiver 114. The transceiver 114 comprises a conventional wireless base transmitter 408 and a conventional wireless base receiver 404 coupled to transmitter and receiver antennas 406, 402, respectively. Alternatively, it will be appreciated that the transceiver 409 may comprise a conventional wireline transceiver 405.

Figure 13:
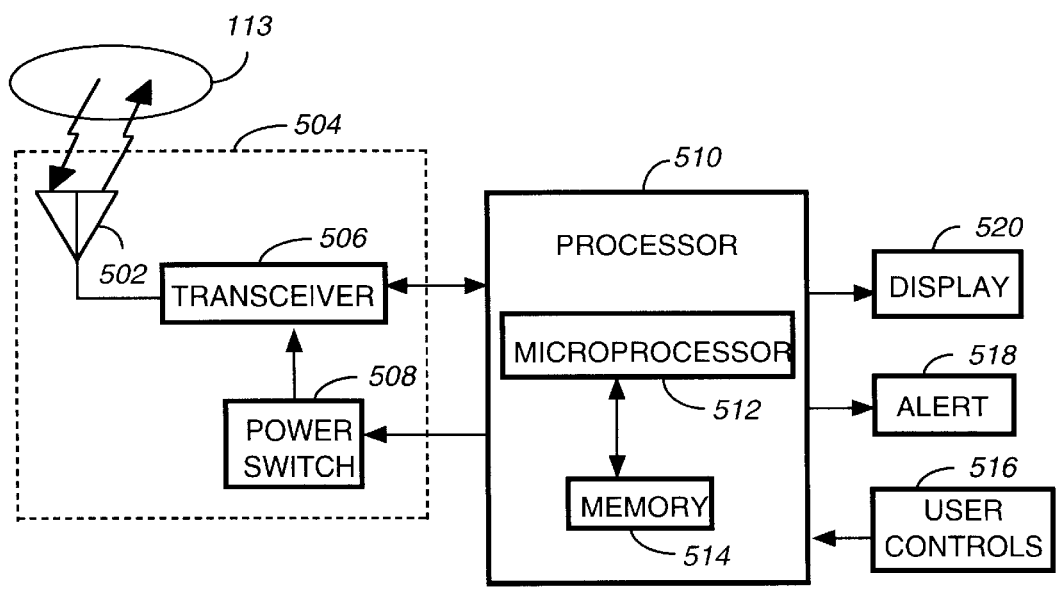

FIG. 13 is an electrical block diagram of the SCR 116 discussed above. The SCR 116 comprises a wireless transceiver 504 for communicating with a communication medium 113, a processor 510 for controlling operation of SCR 116, user controls 516, an alerting device 518, and a display 520. The wireless transceiver 504 is used for receiving messages from the wireless communication medium 113, and for transmitting response messages thereto under the control of the processor 510.

To send and receive messages, the wireless transceiver 504 includes a transceiver antenna 502, a transceiver 506, and a power switch 508. The transceiver antenna 502 is coupled to the transceiver 506 for transmitting and receiving, for example, FM messages to and from the wireless communication medium 113. Upon receiving a FM message from the wireless communication medium 113, the transceiver 506 demodulates the FM message in a conventional manner, thereby providing the processor 510 a demodulated message. Similarly, when a response message is to be transmitted, the processor 510 causes the transceiver 506 to modulate the response message into a response signal that is transmitted on the transceiver antenna 502. The power switch 508 is a conventional switch coupled to the processor 510 for controlling power supplied to the transceiver 506, thereby providing a battery saving function.

To perform the necessary functions of SCR 116, the processor 510 includes a conventional microprocessor 512, and a conventional memory 514. The memory 514 preferably includes a conventional read-only memory (ROM) and a conventional random-access memory (RAM). The microprocessor 512 is programmed by way of the memory 514 for processing selective call messages intended to be displayed to the user of SCR 116. Upon receiving a selective call message, the microprocessor 512 samples the demodulated message generated by the transceiver 506. The microprocessor 512 then decodes an address in the demodulated message, compares the decoded address with one or more addresses stored in the memory 514, and when a match is detected, proceeds to process the remaining portion of the message.

Once the microprocessor 512 has processed the message, it stores the message in the memory 514, and a call alerting signal is generated to alert a user that a message has been received. The call alerting signal is directed to a conventional audible or tactile alerting device 518 for generating an audible or tactile call alerting signal. By the use of appropriate functions provided by the user controls 516, the received message is recovered from the memory 514, and displayed on a display 520. The display 520 is, for example, a conventional liquid crystal display (LCD). Alternatively, when the message is a voice message, the message is played out on a conventional audio circuit (not shown in FIG. 13) that is included in SCR 116.

It should be apparent by now that the present invention has substantial advantages over prior art decentralized communication protocols such as Ethernet and Aloha. Principally, the present invention provides a technique for dividing time into small incremental time slots which, according to the flowcharts above, allow in most instances collision-free transmission between communication devices coupled to a wireline or wireless communication medium. For high traffic communication systems, the present invention provides a collision-free environment that makes the best use of system channel capacity, along with providing the benefits of short message latency.

Although the invention has been described in terms of a preferred embodiment it will be obvious to those skilled in the art that many alterations and variations may be made without departing from the invention. Accordingly, it is intended that all such alterations and variations be considered as within the spirit and scope of the invention as defined by the appended claims.

What is claimed is:

1. In a plurality of transceivers coupled to a communication medium, a method for transmitting collision-free messages to a recipient communication device coupled to the communication medium, comprising the steps of:

dividing a periodic communication cycle into a plurality of time slots, each time slot having a duration equal to or greater than a predetermined propagation delay of a signal transmitted between transceivers;

assigning each of the transceivers to a corresponding one of the time slots; and transmitting a message from a selected one of the transceivers to the recipient communication device, said transmitting step comprising the steps of:

monitoring transmission energy in the communication medium during a time slot immediately preceding the time slot assigned to the transceiver selected; and if the energy measured is below a predetermined threshold, transmitting at least a portion of the message to the recipient communication device beginning at the time slot assigned to the transceiver selected, wherein said transceiver transmits less than the whole message when the length of the message exceeds a predetermined message length, and wherein said transceiver transmits the remainder of the message at the next available opportunity.

2. The method as recited in claim 1, wherein the plurality of transceivers comprise a plurality of wireline transceivers, the recipient communication device comprises a wireline communication device, and wherein the communication medium comprises a wireline communication medium.

3. The method as recited in claim 1, wherein the plurality of transceivers comprise a plurality of wireless transceivers, the recipient communication device comprises a wireless communication device, and wherein the communication medium comprises a wireless communication medium.

4. The method as recited in claim 1, wherein recipient communication device comprises a targeted one of the plurality of transceivers.

5. The method as recited in claim 1, wherein the transceiver selected has a predetermined interval for transmitting the message, and wherein said transceiver transmits less than the whole message when the time necessary for transmitting the message exceeds the predetermined interval, and transmits the remainder of the message at the next available opportunity.

6. The method as recited in claim 1, wherein the transceiver selected transmits a modulated signal, the modulated signal comprising in part a portion of the message, and wherein said modulation terminates before the next occurrence of the time slot assigned to the transceiver selected.

7. The method as recited in claim 1, wherein the predetermined propagation delay is determined from a signal transmitted between a selected two of the plurality of transceivers that are farthest apart.

8. In a plurality of wireless transceivers coupled to a wireless communication medium, a method for transmitting collision-free messages to a plurality of SCRs (Selective Call Radios), comprising the steps of:
 dividing a periodic communication cycle into a plurality of time slots, each time slot having a duration equal to or greater than a predetermined propagation delay of a signal transmitted between wireless transceivers;
 assigning each of the wireless transceivers to a corresponding one of the time slots; and
 transmitting a message from a selected one of the wireless transceivers to a targeted SCR, said transmitting step comprising the steps of:
  determining which of the wireless transceivers is co-located with the targeted SCR;
  at the wireless transceiver co-located with the targeted SCR,
   monitoring transmission energy in the wireless communication medium during a time slot immediately preceding the time slot assigned to said wireless transceiver; and
   if the energy measured is below a predetermined threshold, transmitting at least a portion of the message to the targeted SCR beginning at the time slot assigned to said wireless transceiver,
 wherein said wireless transceiver transmits less than the whole message when the length of the message exceeds a predetermined message length, and wherein said wireless transceiver transmits the remainder of the message at the next available opportunity.

9. The method as recited in claim 8, wherein the wireless transceiver co-located with the targeted SCR has a predetermined interval for transmitting the message, and wherein said wireless transceiver transmits less than the whole message when the time necessary for transmitting the message exceeds the predetermined interval, and wherein said wireless transceiver transmits the remainder of the message at the next available opportunity.

10. The method as recited in claim 8, wherein the wireless transceiver co-located with the targeted SCR transmits a modulated signal, the modulated signal comprising in part a portion of the message, and wherein said modulation terminates before the next occurrence of the time slot assigned to said wireless transceiver.

11. The method as recited in claim 8, wherein the step of determining which of the plurality of wireless transceivers is co-located with the SCR comprises the steps of:
 transmitting from each of the plurality of wireless transceivers a corresponding wireless transceiver identification number;
 transmitting from the plurality of wireless transceivers a simulcast inquiry message to the targeted SCR; and
 receiving a message from the targeted SCR, wherein the message includes a selected one of the identification numbers transmitted by the plurality of wireless transceivers.

12. The method as recited in claim 8, wherein the predetermined propagation delay is determined from a signal transmitted between a selected two of the plurality of transceivers that are farthest apart.

13. In a plurality of SCRs (Selective Call Radios) co-located in a communication zone of a selected one of a plurality of wireless transceivers, a method for transmitting from the SCRs unscheduled collision-free messages to said wireless transceiver, comprising the steps of:
 at said wireless transceiver,
  dividing a periodic communication cycle into a plurality of time slots, each time slot having a duration equal to or greater than a predetermined propagation delay of a signal transmitted between SCRs in the communication zone;
  assigning each of the SCRs to a corresponding one of the time slots; and
 transmitting a message from a selected one of the SCRs to said wireless transceiver, said transmitting step comprising the steps of:
  monitoring transmission energy during a time slot immediately preceding the time slot assigned to said SCR; and
  if the energy measured is below a predetermined threshold, transmitting at least a portion of the message to said wireless transceiver beginning at the time slot assigned to said SCR,
 wherein said SCR transmits less than the whole message when the length of the message exceeds a predetermined message length and wherein said SCR transmits the remainder of the message at the next available opportunity.

14. The method as recited in claim 13, wherein the predetermined propagation delay is determined from a signal transmitted between a selected two of the plurality of SCRs that are farthest apart.

15. The method as recited in claim 13, wherein the assignment step comprises the steps of:
 upon an SCR entering the communication zone of said wireless transceiver; said SCR requesting from said wireless transceiver an assignment to a corresponding one of the time slots; and
 said wireless transceiver transmitting the assignment to said SCR.

16. The method as recited in claim 13, wherein at the transmitting step said SCR has a predetermined interval for transmitting the message, and wherein said SCR transmits less than the whole message when the time necessary for transmitting the message exceeds the predetermined interval, and wherein said SCR transmits the remainder of the message at the next available opportunity.

17. The method as recited in claim 13, wherein at the transmitting step said SCR transmits a modulated signal, the modulated signal comprising in part a portion of the message, and wherein said modulation terminates before the next occurrence of the time slot assigned to said SCR.

18. The method as recited in claim 13, the transmitting step further comprising the steps of:

monitoring at said wireless transceiver an instance where two or more SCRs transmit messages simultaneously to said wireless transceiver; and upon detecting simultaneous transmissions, transmitting a collision detection message to at least a portion of the SCRs co-located with said wireless transceiver informing said SCRs that a transmission interference has occurred.

19. The method as recited in claim 18, wherein for those SCRs receiving the collision detection message, said SCRs revert to transmitting a message at their correspondingly assigned time slot at random times.

20. The method as recited in claim 13, the transmitting step further comprising the steps of:

monitoring at said wireless transceiver an instance where two or more SCRs transmit messages simultaneously to said wireless transceiver; and upon detecting simultaneous transmissions, transmitting a new time slot assignment to at least a portion of the SCRs co-located with said wireless transceiver.

21. A plurality of wireless transceivers for communicating messages to SCRs (Selective Call Radios), comprising:

a radio transceiver; and a processing system coupled to the radio transceiver, wherein a periodic communication cycle is divided into a plurality of time slots, each time slot having a duration equal to or greater than a predetermined propagation delay of a signal transmitted between wireless transceivers;

wherein each of the wireless transceivers is assigned to a corresponding one of the time slots; and wherein to transmit a message from a selected one of the wireless transceivers to a targeted SCR, the processing system of each of the wireless transceivers is adapted to locate the targeted SCR;

once the targeted SCR is located, the processing system of the wireless transceiver co-located with the targeted SCR is adapted to:

enable the radio transceiver to monitor transmission energy in a communication medium during a time slot immediately preceding the time slot assigned to said wireless transceiver; and if the energy measured is below a predetermined threshold, cause the radio transceiver to transmit at least a portion of the message to the targeted SCR beginning at the time slot assigned to said wireless transceiver, wherein to locate the targeted SCR, the processing system of each of the wireless transceivers is adapted to:

cause the radio transceiver to transmit a corresponding a wireless transceiver identification number;

cause the radio transceiver to transmit a simulcast inquiry message to the targeted SCR; and enable the radio transceiver to receive a message from the targeted SCR, wherein the message includes a selected one of the identification numbers transmitted by the plurality of wireless transceivers.

* * * * *